(12) United States Patent
Grimmer et al.

(10) Patent No.: US 9,416,815 B2
(45) Date of Patent: Aug. 16, 2016

(54) DRIVESHAFT WITH TWO-STAGE STIFFNESS

(71) Applicant: GM GLOBAL TECHNOLOGY OPERATIONS LLC, Detroit, MI (US)

(72) Inventors: Michael J. Grimmer, Troy, MI (US); Mark Gehringer, Milford, MI (US); Stephanie A. Ernster, Novi, MI (US); Eric J. Defenderfer, Brighton, MI (US); Stephen H. Miller, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 14/503,531

(22) Filed: Oct. 1, 2014

(65) Prior Publication Data

US 2016/0097420 A1 Apr. 7, 2016

(51) Int. Cl.
*F16C 1/02* (2006.01)
*F16D 3/10* (2006.01)

(52) U.S. Cl.
CPC .... *F16C 1/02* (2013.01); *F16D 3/10* (2013.01)

(58) Field of Classification Search
CPC ..................................... F16C 1/02; F16D 3/10
USPC .................. 464/97, 160; 403/359.1
See application file for complete search history.

(56) References Cited

U.S. PATENT DOCUMENTS

| | | | | |
|---|---|---|---|---|
| 2,590,169 A * | 3/1952 | Fritz | ........................ | F16C 3/02 464/97 X |
| 2,734,359 A * | 2/1956 | Mulheim et al. | ........ | F16F 15/12 464/97 X |
| 4,127,080 A * | 11/1978 | Lakiza | ..................... | F16C 3/02 464/97 X |
| 5,672,111 A * | 9/1997 | Schremmer | ............. | B62D 1/16 |
| 2011/0209961 A1* | 9/2011 | Yamamoto | ............... | F16D 3/10 |

\* cited by examiner

*Primary Examiner* — Gregory Binda
(74) *Attorney, Agent, or Firm* — Quinn Law Group, PLLC

(57) ABSTRACT

A two-stage stiffness driveshaft includes a hollow cylinder defined by a longitudinal axis, a first end, a distal second end, and a hollow cylinder stiffness. The driveshaft also includes an inner shaft extending through the hollow cylinder along the longitudinal axis and defined by a first end, a distal second end, and an inner shaft stiffness. The first end of the inner shaft is engaged with the first end of the hollow cylinder via a rotational clearance fit. The second end of the inner shaft is rotationally fixed to the second end of the hollow cylinder such that the first end of the inner shaft can twist to a predetermined angle with respect to the second end of the inner shaft. The inner shaft stiffness defines a first-stage stiffness of the driveshaft, and the inner shaft stiffness and the hollow cylinder stiffness together define a second-stage stiffness of the driveshaft.

18 Claims, 4 Drawing Sheets

DRIVESHAFT WITH TWO-STAGE STIFFNESS

TECHNICAL FIELD

The disclosure relates to a driveshaft with two-stage stiffness for transmitting torque in a motor vehicle.

BACKGROUND

A driveshaft, such as a propeller shaft or Cardan shaft, or an axle shaft, is a mechanical component used for transmitting rotation and torque from a powerplant. Driveshafts are typically used to connect components of a drive-train that cannot be connected directly because of distance or the need to allow for relative movement between them. In motor vehicles, driveshafts typically transmit torque from the engine to the vehicle's driven wheels. Loads on a vehicle driveshaft are mainly the result of engine output torque overlaid with the engine's torsional vibrations, and the vehicle's inertia. Driveshafts are generally constructed to withstand operating stresses, while limiting additional weight and inertia. Vehicle driveshafts frequently incorporate one or more mechanical joints designed to permit variation in alignment and/or distance between the driving and driven components.

SUMMARY

A two-stage stiffness driveshaft for transmitting an input torque includes a hollow cylinder defined by a longitudinal axis, a first end, a distal second end, and having a hollow cylinder stiffness. The two-stage stiffness driveshaft also includes an inner shaft extending through the hollow cylinder along the longitudinal axis and defined by a first end, a distal second end, and having an inner shaft stiffness. The first end of the inner shaft is engaged with the first end of the hollow cylinder via a rotational clearance fit. The second end of the inner shaft is rotationally fixed to the second end of the hollow cylinder such that the first end of the shaft can twist up to a predetermined angle with respect to the second end of the inner shaft. The inner shaft stiffness defines a first-stage stiffness of the driveshaft, and the inner shaft stiffness and the hollow cylinder stiffness together define a second-stage stiffness of the driveshaft.

The first end of the inner shaft may include a first outer spline and the first end of the hollow cylinder may include a first inner spline. In such a case, the first outer spline is engaged with the first inner spline via the rotational clearance fit at a first interface.

The two-stage stiffness driveshaft may additionally include a seal arranged between the cylinder and the inner shaft. Such a seal may be configured to limit access of the first interface by debris. The seal may be formed from a polymeric compound.

The two-stage stiffness driveshaft may additionally include a coating arranged on at least one of the first outer spline and the first inner spline. Such a coating would be configured to cushion impacts between the first inner spline and the first outer spline.

The second end of the inner shaft may include a second outer spline and the second end of the hollow cylinder may include a second inner spline. In such a case, the second outer spline is press-fit into the second inner spline at a second interface.

The first end of the inner shaft may include an inner shaft flange arranged perpendicular to the longitudinal axis. Additionally, the first end of the hollow cylinder may include a cylinder flange arranged perpendicular to the longitudinal axis. In such a case, the two-stage stiffness driveshaft may additionally include a spring arranged between the inner shaft flange and the cylinder flange and configured to generate friction damping configured to control the twist of the inner shaft.

The spring may be configured as one of a Belleville and a wave washer.

The two-stage stiffness driveshaft may also include a friction washer arranged between the spring and the shaft flange or between the spring and the cylinder flange.

The first-stage stiffness and the friction damping may be together configured to attenuate variation in the input torque transmitted by the driveshaft, and thus reduce potential vibration in the drive-train of the vehicle which employs the subject driveshaft.

A motor vehicle employing such a two-stage stiffness driveshaft is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
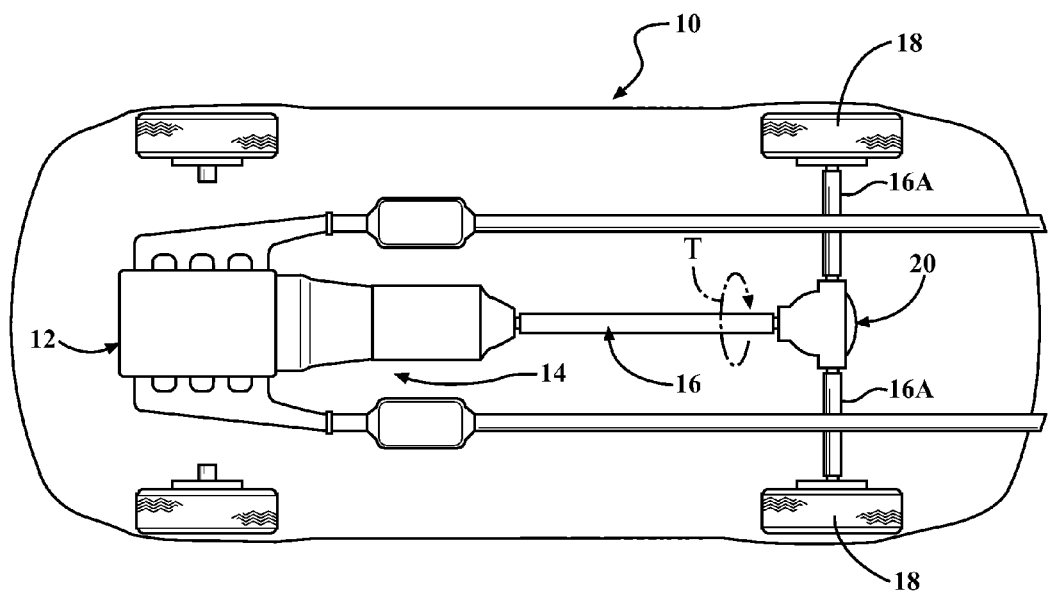
FIG. 1 is a schematic illustration of a motor vehicle drive-train including a two-stage stiffness driveshaft.

Referring to the drawings, wherein like reference numbers refer to like components, FIG. 1 shows a schematic view of a motor vehicle 10 which includes a drive-train adapted for propelling the vehicle. The drive-train includes an internal combustion engine 12, a transmission 14, and includes a two-stage stiffness driveshaft 16 for transmitting engine torque T from the transmission to one or more driven wheels 18 via a differential 20. Although the following disclosure primarily describes the two-stage stiffness driveshaft 16 as a propeller shaft extending longitudinally between the transmission 14 and the differential 20, the two-stage stiffness driveshaft 16 may also be employed as an axle shaft that extends between the differential 20 and the driven wheel 18 and denoted by numeral 16A.

Figure 2:
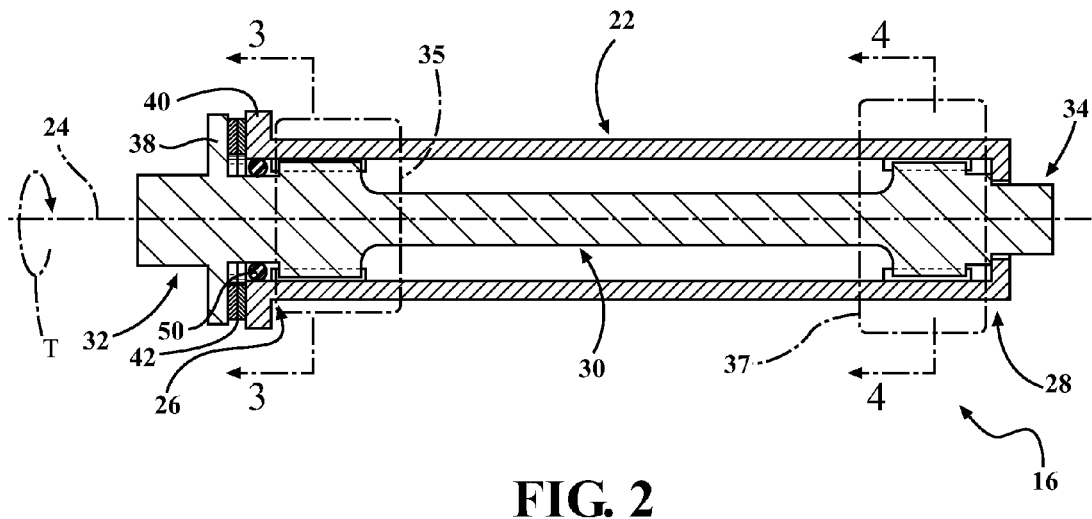
FIG. 2 is a schematic close-up cross-sectional illustration of the two-stage stiffness driveshaft depicted in FIG. 1, the driveshaft having an inner shaft extending through and engaging a hollow cylinder.
Figure 7:
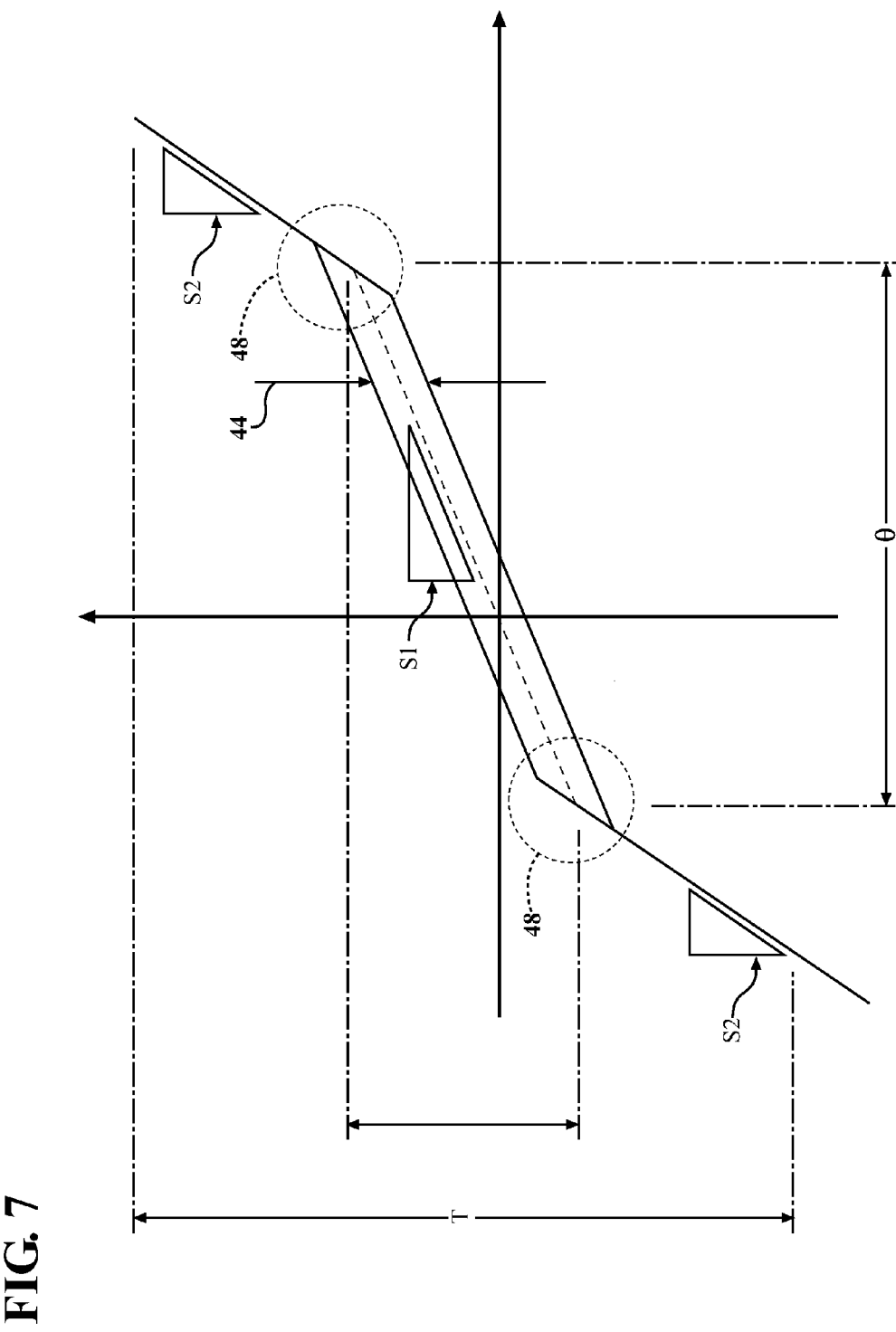
FIG. 7 is a graph of an angle of twist versus input torque for the two-stage stiffness driveshaft depicted in FIGS. 1-6.

As shown in FIG. 2, the driveshaft 16 is configured to control, i.e., absorb, filter, and/or attenuate, variations in engine torque T, and includes a hollow cylinder 22. The hollow cylinder 22 is defined by a longitudinal axis 24, a first end 26, and a distal second end 28. The hollow cylinder 22 also has a hollow cylinder stiffness. The driveshaft 16 also includes an inner shaft 30 extending through the hollow cylinder 22 along the longitudinal axis 24. The inner shaft 30 is defined by a first end 32, a distal second end 34, and having an inner shaft stiffness. Additionally, the inner shaft 30 may have an optional hollow construction. The first end 32 of the inner shaft 30 is engaged with the first end 26 of the hollow cylinder 22 via a rotational clearance fit 33 (shown in FIG. 3) at a first interface 35. The stiffness of the inner shaft 30 defines a first-stage stiffness or spring factor S1 of the driveshaft 16, as shown in FIG. 7. Additionally, the combined stiffness of the inner shaft 30 and of the hollow cylinder 22 defines a second-stage stiffness or spring factor S2 of the driveshaft 16, as also shown in FIG. 7.

The second end 34 of the inner shaft 30 is rotationally fixed to the second end 28 of the hollow cylinder 22. The fixed connection of the inner shaft 30 to the hollow cylinder 22 at the respective second ends 34, 28 facilitate twisting of the inner shaft 30, i.e., angular displacement of the first end 32 with respect to the second end 34 in response to the input engine torque T of sufficient magnitude. The maximum twist of the inner shaft 30 is defined by the rotational clearance fit 33 between the first ends 32 and 26 of the respective inner shaft 30 and hollow cylinder 22, and is limited to a predetermined angle θ (shown in FIG. 7). Each of the hollow cylinder 22 and the inner shaft 30 may be constructed from a high strength formable material, such as aluminum or steel, and be reinforced for additional stiffness with a material such as carbon fiber. Accordingly, the second-stage stiffness S2 of the driveshaft 16 is attained after the inner shaft 30 experiences maximum twist that is defined by the rotational clearance fit 33.

Figure 3:
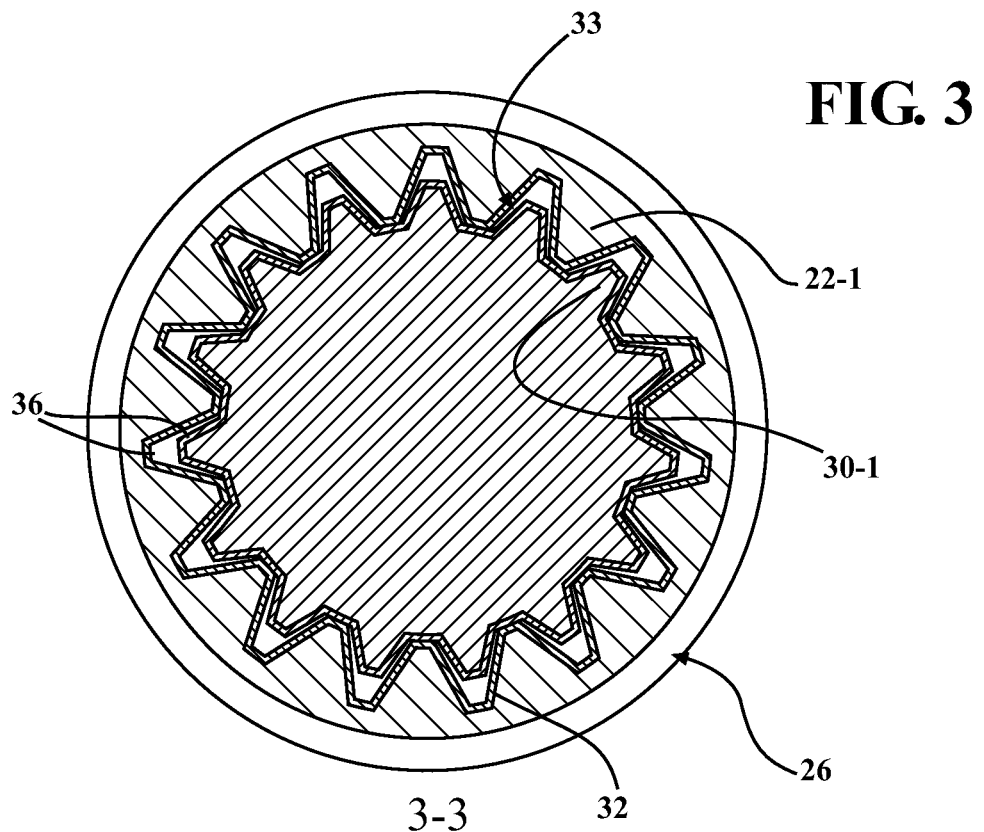
FIG. 3 is a schematic close-up illustration of a section through a first interface between the inner shaft and the hollow cylinder.

As shown in section 3-3 illustrated in FIG. 3, the first end 32 of the inner shaft 30 may include a first outer spline 30-1 and the first end 26 of the hollow cylinder 22 includes a first inner spline 22-1. The first outer spline 30-1 of the inner shaft 30 and the first inner spline 22-1 of the hollow cylinder 22 are engaged such that a predetermined amount of lash is established therebetween. Accordingly, the rotational clearance fit 33 at the respective first ends 32 and 26 may be established via the lash in the engagement between the first outer spline 30-1 and the first inner spline 22-1, such that the maximum twist of the inner shaft 30 is limited to the predetermined angle θ. A specific portion of the rotational clearance fit 33 may be established between adjacent faces of the first outer spline 30-1 and the first inner spline 22-1 on each of the drive, i.e., torque T in positive direction, and coast, i.e., torque T in negative direction, sides of the spline engagement. Such specific portions of the rotational clearance fit 33 allocated between the drive and coast sides of the engagement of splines 30-1, 22-1 may be established via numerical computations and/or empirical analysis, while the predetermined angle θ is indicative of the entire clearance fit 33, as may be seen in FIG. 7.

Figure 4:
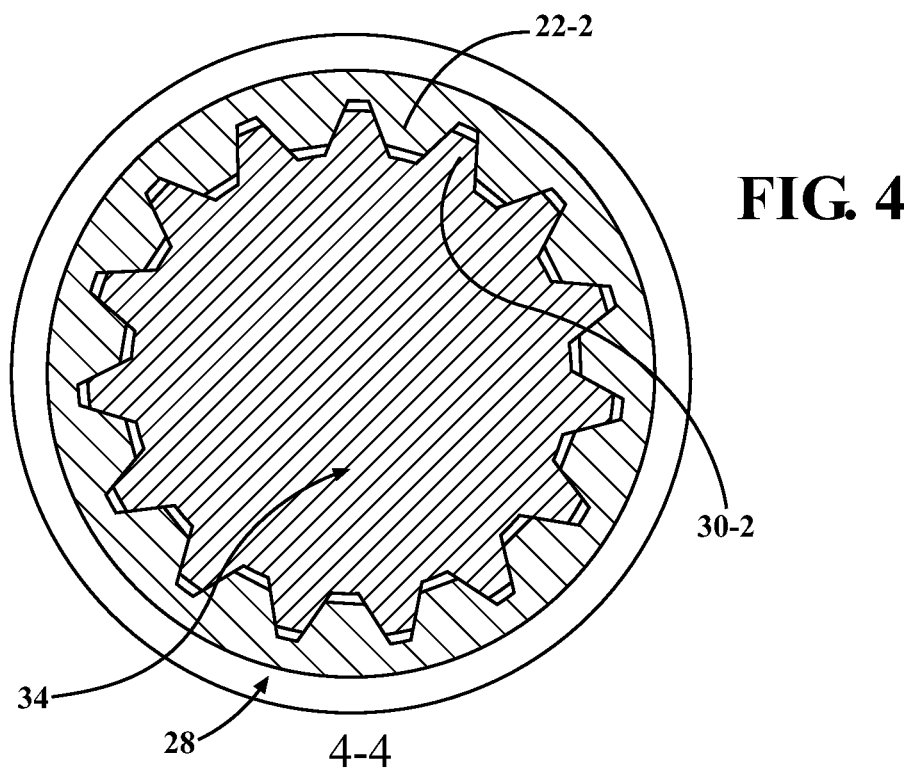
FIG. 4 is a schematic close-up illustration of a section through a second interface between the inner shaft and the hollow cylinder.

A coating 36 may be arranged on at least one of the first outer spline 30-1 and the first inner spline 22-1. The coating 36 is configured to cushion impacts between the first inner spline 22-1 and the first outer spline 30-1 that may occur during transition between the first-stage stiffness S1 and the second-stage stiffness S2 of the driveshaft 16 under application of engine torque T. As shown in section 4-4 illustrated in FIG. 4, the second end 34 of the inner shaft 30 may include a second outer spline 30-2 and the second end 28 of the hollow cylinder 22 includes a second inner spline 22-2. The second outer spline 30-2 may be press-fit into the second inner spline 22-2 at a second interface 37 to thereby establish the rotationally fixed connection of the second end to the second end 28. Accordingly, the subject press-fit between the second outer spline 30-2 and the second inner spline 22-2 is employed to establish the allocation of specific portions of the rotational clearance fit 33 between the drive and coast sides of the engagement of splines 30-1, 22-1.

As shown in FIG. 2, the first end 32 of the inner shaft 30 may additionally include an inner shaft flange 38. The inner shaft flange 38 is arranged perpendicular to the longitudinal axis 24. For its part, the first end 26 of the hollow cylinder 22 includes a cylinder flange 40 arranged perpendicular to the longitudinal axis 24. The cylinder flange 40 acts as a complementary feature to the inner shaft flange 38. A spring, indicated generally via numeral 42 in FIG. 2, is arranged between the inner shaft flange 38 and the cylinder flange 40. The spring 42 is configured to generate friction damping 44 (shown in FIG. 7) for controlling the twist of the inner shaft 30. The spring 42 may be configured as either a wave washer 42A (shown in FIG. 5) or a Belleville washer 42B (shown in FIG. 6).

Figure 5:
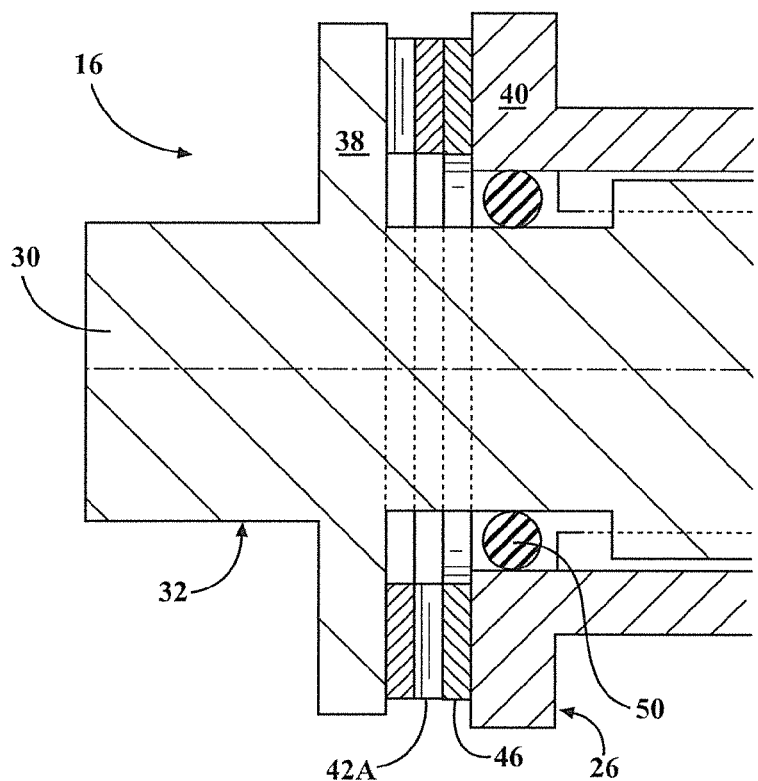
FIG. 5 is a schematic close-up illustration of a spring acting against a friction washer in the two-stage stiffness driveshaft depicted in FIGS. 1-2.
Figure 6:
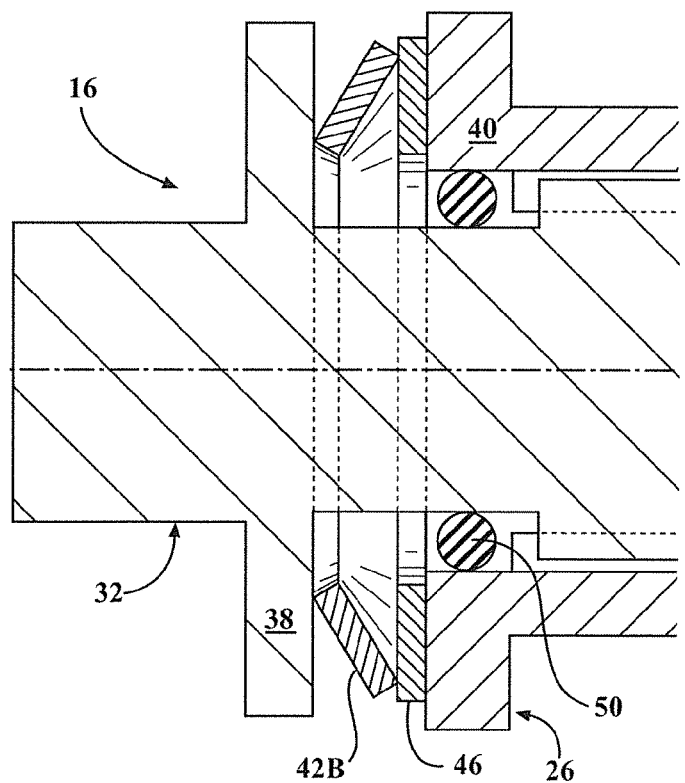
FIG. 6 is a schematic close-up illustration of another embodiment of a spring acting against a friction washer in the two-stage stiffness driveshaft depicted in FIGS. 1-2.

As shown in FIGS. 5-6, the driveshaft 16 may additionally include a friction washer 46 arranged between the spring 42 and the shaft flange 38. In the alternative, the friction washer 46 may be arranged between the spring 42, such as the wave washer 42A or the Belleville washer 42B, and the cylinder flange 40. The friction washer 46 may be configured from graphite or any other appropriate material that is capable of providing stable friction characteristics under a wide range of operating conditions of the vehicle 10. The friction washer 46 may be employed for generating appropriate hysteresis for consistent friction damping when the input torque engine T is being filtered by the first-stage stiffness S1 of the driveshaft 16 through the predetermined angle θ. Accordingly, the first-stage stiffness S1 and the friction damping are together configured to attenuate variation in the input engine torque T that is to be transmitted by the driveshaft 16, and thus reduce potential vibration in the drive-train of the vehicle 10. The first-stage stiffness S1, in combination with the attendant friction damping, is primarily intended to provide effective filtering of high-amplitude and low-frequency oscillations in engine torque T, such as may be encountered during vehicle cruising conditions.

On the other hand, the second-stage stiffness S2 is intended to provide reduced driveshaft compliance for vehicle acceleration under high engine torque T, such as at wide-open-throttle. Furthermore, a transition 48 (shown in FIG. 7) between the first-stage stiffness S1 and second-stage stiffness S2 is controlled by the friction damping or hysteresis 44 provided via the spring 42 and optionally with the addition of the friction washer 46. The hysteresis 44 is generated by the friction washer 46 and is primarily intended to reduce oscillation amplitude when the driveshaft 16 is operated in the first-stage, i.e., at stiffness S1, which may take place during high amplitude transient maneuvers. Accordingly, the transition 48 between the first-stage stiffness S1 and the second-stage stiffness S2 is intended to facilitate control of vehicle maneuvers that involve transition between drive and coast torque, thus generating transient torque oscillations. Such transient torque oscillations may be generated when the direction of torque transmitted by the driveshaft switches from the engine torque T driving the vehicle 10 to the vehicle inertia back-driving the drive-train and generating engine braking.

The driveshaft 16 may additionally include a seal 50. The seal 50 may be arranged between the cylinder 22 and the inner shaft 30 proximate the inner shaft flange 38 and the cylinder flange 40. The seal 50 is configured to limit access of the first interface 35 by road-borne debris. The seal 50 may have an O-ring cross-section and be formed from a suitable compliant material, such as a polymeric compound, that is capable of providing reliable sealing under a wide range of operating conditions of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A two-stage stiffness driveshaft for transmitting an input torque, the two-stage stiffness driveshaft comprising:
   a hollow cylinder defined by a longitudinal axis, a first end, a distal second end, and having a hollow cylinder stiffness; and
   an inner shaft extending through the hollow cylinder along the longitudinal axis and defined by a first end, a distal second end, and having an inner shaft stiffness;
   wherein:
      the first end of the inner shaft is engaged with the first end of the hollow cylinder via a rotational clearance fit;
      the second end of the inner shaft is rotationally fixed to the second end of the hollow cylinder such that the first end of the inner shaft will twist to a predetermined angle with respect to the second end of the inner shaft in response to the input torque;
      the inner shaft stiffness defines a first-stage stiffness of the driveshaft and the inner shaft stiffness together with the hollow cylinder stiffness defines a second-stage stiffness of the driveshaft;
      the first end of the inner shaft includes an inner shaft flange arranged perpendicular to the longitudinal axis;
      the first end of the hollow cylinder includes a cylinder flange arranged perpendicular to the longitudinal axis; and
      a spring is arranged between the inner shaft flange and the cylinder flange and configured to generate friction damping to control the twist of the inner shaft.

2. The two-stage stiffness driveshaft of claim 1, wherein:
   the first end of the inner shaft includes a first outer spline and the first end of the hollow cylinder includes a first inner spline; and
   the first outer spline is engaged with the first inner spline via the rotational clearance fit at a first interface.

3. The two-stage stiffness driveshaft of claim 2, further comprising a seal arranged between the hollow cylinder and the inner shaft, and configured to limit access of debris to the first interface.

4. The two-stage stiffness driveshaft of claim 3, wherein the seal is formed from a polymeric compound.

5. The two-stage stiffness driveshaft of claim 2, further comprising a coating arranged on at least one of the first outer spline and the first inner spline, wherein the coating is configured to cushion impacts between the first inner spline and the first outer spline.

6. The two-stage stiffness driveshaft of claim 2, wherein:
   the second end of the inner shaft includes a second outer spline and the second end of the hollow cylinder includes a second inner spline; and
   the second outer spline is press-fit into the second inner spline at a second interface.

7. The two-stage stiffness driveshaft of claim 1, wherein the spring is configured as one of a Belleville and a wave washer.

8. The two-stage stiffness driveshaft of claim 1, further comprising a friction washer arranged between the spring and the shaft flange or between the spring and the cylinder flange.

9. The two-stage stiffness driveshaft of claim 1, wherein the first-stage stiffness and the friction damping are together configured to attenuate variation in the input torque transmitted by the driveshaft.

10. A drive-train for a motor vehicle comprising:
    a power-plant configured to generate torque;
    a road wheel; and
    a two-stage stiffness driveshaft configured to transmit torque from power-plant to the road wheel, the driveshaft including:
       a hollow cylinder defined by a longitudinal axis, a first end, a distal second end, and having a hollow cylinder stiffness; and
       an inner shaft extending through the hollow cylinder along the longitudinal axis and defined by a first end, a distal second end, and having an inner shaft stiffness;
       wherein:
          the first end of the inner shaft is engaged with the first end of the hollow cylinder via a rotational clearance fit, and is configured to receive the torque from the power-plant;
          the second end of the inner shaft is rotationally fixed to the second end of the hollow cylinder such that the first end of the inner shaft will twist to a predetermined angle with respect to the second end of the inner shaft in response to the torque received from the power-plant;
          the inner shaft stiffness defines a first-stage stiffness of the driveshaft and the inner shaft stiffness together with the hollow cylinder stiffness defines a second-stage stiffness of the driveshaft;
          the first end of the inner shaft includes an inner shaft flange arranged perpendicular to the longitudinal axis;
          the first end of the hollow cylinder includes a cylinder flange arranged perpendicular to the longitudinal axis; and
          a spring is arranged between the inner shaft flange and the cylinder flange and configured to generate friction damping to control the twist of the inner shaft.

11. The drive-train of claim 10, wherein:
    the first end of the inner shaft includes a first outer spline and the first end of the hollow cylinder includes a first inner spline; and
    the first outer spline is engaged with the first inner spline via the rotational clearance fit at a first interface.

12. The drive-train of claim 11, further comprising a seal arranged between the hollow cylinder and the inner shaft, and configured to limit access of debris to the first interface.

13. The drive-train of claim 12, wherein the seal is formed from a polymeric compound.

14. The drive-train of claim 11, further comprising a coating arranged on at least one of the first outer spline and the first inner spline, wherein the coating is configured to cushion impacts between the first inner spline and the first outer spline.

15. The drive-train of claim 11, wherein:
the second end of the inner shaft includes a second outer spline and the second end of the hollow cylinder includes a second inner spline; and
the second outer spline is press-fit into the second inner spline at a second interface.

16. The drive-train of claim 10, wherein the spring is configured as one of a Belleville and a wave washer.

17. The drive-train of claim 10, further comprising a friction washer arranged between the spring and the inner shaft flange or between the spring and the cylinder flange.

18. The drive-train of claim 10, wherein the first-stage stiffness and the friction damping are together configured to attenuate variation in the torque of the power-plant transmitted by the driveshaft.

\* \* \* \* \*